US011096135B2

(12) United States Patent
Hisch

(10) Patent No.: US 11,096,135 B2
(45) Date of Patent: Aug. 17, 2021

(54) METHOD AS WELL AS DEVICE FOR TIMESLOT-WISE DETECTION OF AT LEAST ONE RADIO SIGNAL

(71) Applicant: Rohde & Schwarz GmbH & Co. KG, Munich (DE)

(72) Inventor: Martin Hisch, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 109 days.

(21) Appl. No.: 16/680,276

(22) Filed: Nov. 11, 2019

(65) Prior Publication Data

US 2020/0245271 A1 Jul. 30, 2020

(30) Foreign Application Priority Data

Jan. 30, 2019 (EP) .................................... 19154498

(51) Int. Cl.
*H04W 56/00* (2009.01)
*H04L 5/14* (2006.01)
(Continued)

(52) U.S. Cl.
CPC ............ *H04W 56/001* (2013.01); *H04L 5/14* (2013.01); *H04L 43/045* (2013.01); *H04W 72/082* (2013.01); *H04W 84/042* (2013.01)

(58) Field of Classification Search
None
See application file for complete search history.

(56) References Cited

U.S. PATENT DOCUMENTS

2008/0008147 A1\* 1/2008 Nakayama .......... H04W 72/082
370/338
2012/0032854 A1\* 2/2012 Bull ....................... H04K 3/224
342/450
(Continued)

FOREIGN PATENT DOCUMENTS

EP 1380184 B1 1/2007
EP 1005774 B1 3/2007
(Continued)

OTHER PUBLICATIONS

3GPP Change Request R1-181252, "Synchronisation Slot Time Difference of Arrival", (Year: 2018).\*
(Continued)

*Primary Examiner* — Chi H Pham
*Assistant Examiner* — Vladislav Y Agureyev
(74) *Attorney, Agent, or Firm* — Christensen O'Connor Johnson Kindness PLLC

(57) ABSTRACT

A method of timeslot-wise detection of at least one radio signal in a cellular radio network. A radio signal is received via at least one first radio antenna and at least one second radio antenna. The radio signal received by the respective radio antennas is forwarded to at least one first radio receiver assigned to the first radio antenna and to at least one second radio receiver assigned to the second radio antenna. The radio signal forwarded is evaluated. The radio receivers are synchronized with a preconfigured frame structure. At least one identical time slot is selected out of the frame structure. Timing information of the selected time slot is provided from the first radio receiver to the second radio receiver, from the second radio receiver to the first radio receiver and/or from the respective radio receiver to a central unit for calculating a time difference of arrival. Further, a device for timeslot-wise detection is described.

19 Claims, 2 Drawing Sheets

(51) Int. Cl.
*H04L 12/26* (2006.01)
*H04W 72/08* (2009.01)
*H04W 84/04* (2009.01)

(56) References Cited

U.S. PATENT DOCUMENTS

| | | | |
|---|---|---|---|
| 2014/0221005 A1* | 8/2014 | Marshall | G01S 5/0273 |
| | | | 455/456.1 |
| 2014/0269849 A1* | 9/2014 | Abdelmonem | H04W 72/0446 |
| | | | 375/148 |
| 2014/0335879 A1* | 11/2014 | Immendorf | H04W 72/082 |
| | | | 455/452.1 |
| 2017/0227625 A1* | 8/2017 | Markhovsky | H04W 56/001 |
| 2017/0237484 A1* | 8/2017 | Heath | H04B 10/07953 |
| | | | 398/26 |
| 2019/0191317 A1* | 6/2019 | Safavi | H04W 24/02 |
| 2019/0208387 A1* | 7/2019 | Jiang | H04W 72/044 |
| 2019/0342775 A1* | 11/2019 | Christopherson | H04W 16/10 |
| 2020/0107227 A1* | 4/2020 | Xu | H04J 11/0056 |
| 2020/0322752 A1* | 10/2020 | Eggert | H04W 4/02 |
| 2020/0329518 A1* | 10/2020 | Liu | H04W 28/0268 |

FOREIGN PATENT DOCUMENTS

| | | |
|---|---|---|
| WO | 2006/110475 A2 | 10/2006 |
| WO | 2012/091855 A1 | 7/2012 |

OTHER PUBLICATIONS

IEEE Transactions on Parallel and Distributed Systems, vol. 24, No. 8, Aug. 2013, High-Accuracy TDOA-Based Localization without Time Synchronization Bin Xu, Member, IEEE, Guodong Sun, Member, IEEE (Year: 2013).*

* cited by examiner

METHOD AS WELL AS DEVICE FOR TIMESLOT-WISE DETECTION OF AT LEAST ONE RADIO SIGNAL

FIELD OF THE DISCLOSURE

Embodiments of the present disclosure relate to a method of timeslot-wise detection of at least one radio signal in a cellular radio network. Further, embodiments of the present disclosure relate to a device for timeslot-wise detection of at least one radio signal in a cellular radio network.

BACKGROUND

Operators of a time domain cellular radio network such as a long term evolution (LTE) network are facing the challenge to detect and eliminate interfering signals in their radio networks since these interfering signals disturb or rather interfere with the wanted signals. In contrast to frequency domain cellular radio networks in which uplink signals and downlink signals are transmitted in different frequency ranges, time domain cellular radio networks use the same frequency (range) for uplink signals and downlink signals since the respective signals, namely the uplink signals and downlink signals, are transmitted at different times. The respective times are called time slots which are allocated to uplink or rather downlink signals. Accordingly, the time domain cellular radio network that is assigned to time-division duplexing (TDD) is generally a cellular radio network based on time slots.

For locating an emitter of an interfering signal, directional antennas are typically used in order to retrieve directional information of the signals received by the directional antenna. This technique relates to direction finding. Usually, the directional antenna is assigned to an electronic compass that is used for locating the emitter. In general, the directional information comprises the azimuth that is of importance for locating the source of the interfering signal. For direction finding, a user may alter his position in order to vary the relative orientation, namely azimuth, with respect to the emitter while continuously checking the level of the signal. The higher the level of the signal of interest, for instance the interfering one, the closer to the emitter the user is.

However, locating an emitter of an interfering signal by searching the maximum level of the interfering signal is time consuming. In addition, the required efforts are high due to reflections of the interfering signals which may result in misrouting.

Moreover, direction finding of an interferer, namely an emitter of an interfering signal, in a time domain cellular radio network is specifically time consuming due to the periodic switching between uplink time slots and downlink time slots.

SUMMARY

Therefore, there is a need for a faster and easier way to locate an emitter, for example in a cellular radio network based on time slots.

Embodiments of the present disclosure provide a method of timeslot-wise detection of at least one radio signal in a cellular radio network. The radio signal is received via at least one first radio antenna and at least one second radio antenna. The radio signal received by the respective radio antennas is forwarded to at least one first radio receiver assigned to the first radio antenna and to at least one second radio receiver assigned to the second radio antenna. The forwarded radio signal is evaluated by the following steps:

Synchronizing the first radio receiver with a preconfigured frame structure and synchronizing the second radio receiver with a preconfigured frame structure, Selecting at least one identical time slot out of the frame structure at the first radio receiver and the second radio receiver, and Providing timing information of the selected time slot from the first radio receiver to the second radio receiver, from the second radio receiver to the first radio receiver and/or from the respective radio receiver to a central unit for calculating a time difference of arrival.

Further, embodiments of the present disclosure provide a device for timeslot-wise detection of at least one radio signal in a cellular radio network. In an embodiment, the device comprises at least one first radio antenna configured to receive the radio signal, at least one second radio antenna configured to receive the radio signal, at least one first radio receiver configured to process the radio signal, at least one second radio receiver configured to process the radio signal and at least one evaluation unit. In an embodiment, the evaluation unit is configured to evaluate the at least one radio signal. The evaluation unit is also configured to synchronize the respective radio receivers with a preconfigured frame structure and to select at least one identical time slot out of the frame structure at the respective radio receivers. The evaluation unit is further configured to provide timing information of the selected time slot from the first radio receiver to the second radio receiver, from the second radio receiver to the first radio receiver and/or from the respective radio receiver to a central unit for calculating a time difference of arrival.

The present disclosure is based on the idea that an emitter of a radio signal assigned to time slot technique such as a time domain cellular radio network, for instance a time domain long term evolution network (TD LTE network), can be identified or rather located in a fast and easy manner while synchronizing the radio receivers with the preconfigured frame structure used in the respective cellular radio network. Hence, a specific time slot can be identified and selected out of the preconfigured frame structure that comprises several time slots. For instance, the time slot selected corresponds to a time slot assigned to uplink.

During the specific time slot, a time difference of arrival (TDoA) is calculated that is assigned to direction finding in order to compare the time of arrival at the respective radio antennas in order to calculate the time difference of arrival. This information can be used to derive directional information of the radio signal emitted by the emitter, for instance information with regard to azimuth that can be used to locate the emitter. Hence, the direction finding is based on the evaluation of the time difference of arrival.

Furthermore, the radio signal received is processed, for example measured, by two separate radio receivers that are unambiguously assigned to a respective radio antenna. In other words, each radio receiver has its own radio antenna. The radio receivers correspond to radio sensors as they process or rather measure the radio signal received from the corresponding radio antenna.

Accordingly, the emitter of the at least one radio signal can be located in a faster manner regardless whether the radio signal received and processed is a wanted one, namely a signal without any interfering signal portions, or a faulty signal, namely an interfering signal.

In other words, a timeslot-wise direction finding is provided since the times of arrival of the signals received by the radio antennas are determined during the at least one specific time slot selected from the preconfigured frame structure, namely the identical time slot. As mentioned, the times of arrival are used to determine the time difference of arrival of the radio signal at the separate radio antennas wherein the direction finding is based on the time difference of arrival.

The (preconfigured) frame structure may be derived from the at least one radio signal received that was transmitted with the preconfigured frame structure. For this purpose, the at least one evaluation unit is configured to demodulate the radio signal received in order to determine the (preconfigured) frame structure. In other words, the (preconfigured) frame structure used by the radio signal is detected automatically.

Alternatively or additionally, the (preconfigured) frame structure is obtained by selecting a certain communication standard of interest while performing the method of timeslot-wise detection of the at least one radio signal. The respective communication standard selected is assigned to a certain (preconfigured) frame structure so that the frame structure is (indirectly) selected in a manual manner by the user of the device.

The frame structure generally relates to the structure of the different time slots as well as their allocation.

In general, a trigger may be applied on the radio signal received in order to identify the specific time slot(s), for example time slot(s) assigned to uplink. The trigger may be applied in a zero span operation mode of the device. In the zero span operation mode, no sweeping takes place. In other words, the device becomes a fixed-tuned radio receiver system. In some embodiments, the zero span operation mode may relate to a span of "0 Hz".

The trigger may be a periodic trigger, for instance 10 ms, or rather a gated trigger.

In some embodiments, the gated trigger ensures that only signals appearing during the "gate" period are displayed. The gate can be defined graphically in the zero span operation mode in terms of a gate delay and a gate length.

In some embodiments, at least one specific time slot of the frame structure is selected, namely the one assigned to uplink.

In some embodiments, the radio receivers (radio sensors) each may provide a time stamp to the signal received via the corresponding antenna such that a time difference of arrival can be evaluated by the at least one evaluation unit connected to the radio receivers (radio sensors).

Generally, all radio receivers are connected to the at least one evaluation unit such that the time stamps of the signals received by the respective radio antennas are forwarded to the at least one evaluation unit. Then, the at least one evaluation unit determines a timing information of the selected time slot which is provided.

The at least one evaluation unit may obtain recorded baseband data or rather baseband signals that are assigned to the at least one radio signal wherein the respective baseband signals are provided by the radio receivers.

In some embodiments, the at least one evaluation unit may receive the recorded baseband signals from all radio receivers (radio sensors) connected with the at least one evaluation unit wherein a respective time stamp is assigned to the recorded baseband signals.

The respective baseband signals may be correlated with each other by the at least one evaluation unit in order to obtain the respective times of arrival or rather time spans of the signals.

Generally, the timing information provided may relate to the correlation of the radio signal received by the at least two radio antennas or rather processed by the at least two radio receivers (radio sensors), namely the baseband signals or rather baseband data. The baseband signals gathered simultaneously by the at least two radio receivers (radio sensors) are processed by the at least one evaluation unit in order to determine the time difference of arrival (TDoA) at the separate radio antennas.

The device may comprise a specific radio antenna that can be used for direction finding such as a directional antenna.

In some embodiments, a location of an emitter of the at least one radio signal is determined by calculating the time difference of arrival (TDoA). Put it another way, the at least one evaluation unit is configured to determine a location of an emitter of the at least one radio signal. As mentioned, determining the time difference of arrival of the signal received by the separate radio antennas corresponds to a specific direction finding technique to locate the emitter of the radio signal.

The respective radio antenna and the corresponding radio receiver may be connected with each other so that the radio signal received by the respective radio antenna is forwarded to the corresponding radio receiver (radio sensor). Accordingly, an unambiguous assignment is provided for the radio antennas and the corresponding radio receivers. In some embodiments, the at least one radio signal is received via the respective radio antenna wherein the received signal is forwarded to the corresponding radio receiver for measuring or rather processing purposes.

Further, one evaluation unit may be provided for each radio receiver so that each radio receiver is assigned to its own evaluation unit, in particular wherein the at least two evaluation units are interconnected with each other. Thus, the signal measured or rather processed by each radio receiver (radio sensor) is forwarded to a corresponding evaluation unit for evaluation purposes.

Generally, the at least one evaluation unit is assigned to a processor on which a software runs. Hence, the at least one evaluation unit may be established by a respective software module.

The radio receivers may be connected with the processor wherein the software modules running on the processor are assigned to the corresponding radio receivers.

According to an aspect, the radio receivers are synchronized with a system clock and/or a timing source of the cellular radio network. For instance, a long term evolution (LTE) network uses a system clock. In other applications, namely other cellular radio networks, the synchronization may be done with respect to a relevant timing source that is used by the respective application. In any case, the synchronization with regard to the respective application or rather communication standard ensures that the radio receivers are synchronized appropriately with the preconfigured frame structure, namely the time slots.

For instance, the radio receivers are synchronized with an internal clock of the device. The internal clock may be assigned to the system clock or rather the timing source of the cellular radio network.

According to another aspect, the preconfigured frame structure corresponds to a communication standard to be investigated that is used by the cellular radio network. In other words, the preconfigured frame structure used for synchronizing the radio receivers depends on the respective application. Hence, the radio receivers are synchronized differently depending on the communication standard under investigation.

According to an embodiment, at least one interference is detected in the at least one radio signal such that an interfering emitter is identified. The at least one evaluation unit may be configured to detect at least one interference in the at least one radio signal in order to identify an interfering emitter. The interfering emitter may emit an interfering signal that may disturb a wanted signal wherein both signals are signal portions of the at least one radio signal received by the radio antennas and processed by the radio receivers.

Generally, the at least one radio signal received may comprise wanted signal(s) as well as interfering signal(s) wherein the wanted signal(s) as well as the interfering signal(s) correspond to signal portion(s) of the radio signal.

In some embodiments, the interfering emitter detected is displayed graphically and/or wherein the interfering emitter detected is written to a flag. Hence, the at least one evaluation unit and the display may be configured to graphically display the interfering emitter detected on the display. Further, the at least one evaluation unit and the display may be configured to write the interfering emitter detected to a flag. Thus, information with regard to the interfering emitter detected is outputted or rather stored. Hence, the user can be informed appropriately.

According to another aspect, the time difference of arrival calculated is post-processed. Hence, a post-processor is provided that is connected to the at least one evaluation unit, wherein the post-processor is configured to post-process the time difference of arrival calculated. Generally, any kind of post-processing can be done by the post-processor. The post-processing may result in a graphical output in order to inform a user or rather in providing the result to another apparatus.

Moreover, a trigger or rather a filter may be applied while post-processing the time difference of arrival calculated.

In some embodiments, the post-processing may relate to locating the emitter of the radio signal received.

A level trigger may be applied in order to separate a real interfering signal (portion) from noise.

For instance, the location of the emitter identified by direction finding, particularly based on the time difference of arrival calculated, is graphically displayed. Accordingly, a display is provided with which the at least one evaluation unit is connected. In some embodiments, the at least one evaluation unit and the display are configured to graphically display the identified location of the emitter on the display. The graphic illustration may correspond to an azimuth dial, an illustration of the respective direction and/or a signal-beam while simultaneously displaying a map.

For instance, hyperbola derived from the time spans of the signals processed may be displayed, for example on a map. The map illustrated may correspond to a heat map.

In addition, triangulation on a map may be displayed in order to provide the respective information obtained from the timing information obtained.

Generally, a map may be displayed such that locating the emitter is simplified as the map provides geographical information for the user of the device supporting the orientation of the user.

Furthermore, the signal of the respective radio receiver, particularly each radio receiver upon selection, may be displayed in the zero span operation mode of the device to enable the user to check the time slot selected.

Alternatively or additionally, a flag for a correct or rather faulty signal is set. The post-processor may be configured to set a flag for a correct or rather faulty signal. Thus, the user is informed about the kind of signal(s) the radio signal is composed of, for instance whether the at least one radio signal comprises a wanted signal or not.

Further, the device may be a direction finder with a directional antenna unit. Since the device is configured to locate an emitter of the at least one radio signal by direction finding in the at least one time slot selected, the device outputs a bearing value as a result. Therefore, the device corresponds to a direction finder.

The directional antenna unit may comprise several antenna elements or rather a single one. For instance, the radio antennas are part of the directional antenna unit since the radio antennas are (also) used for direction finding purposes.

Generally, the device described above is configured to perform the method described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
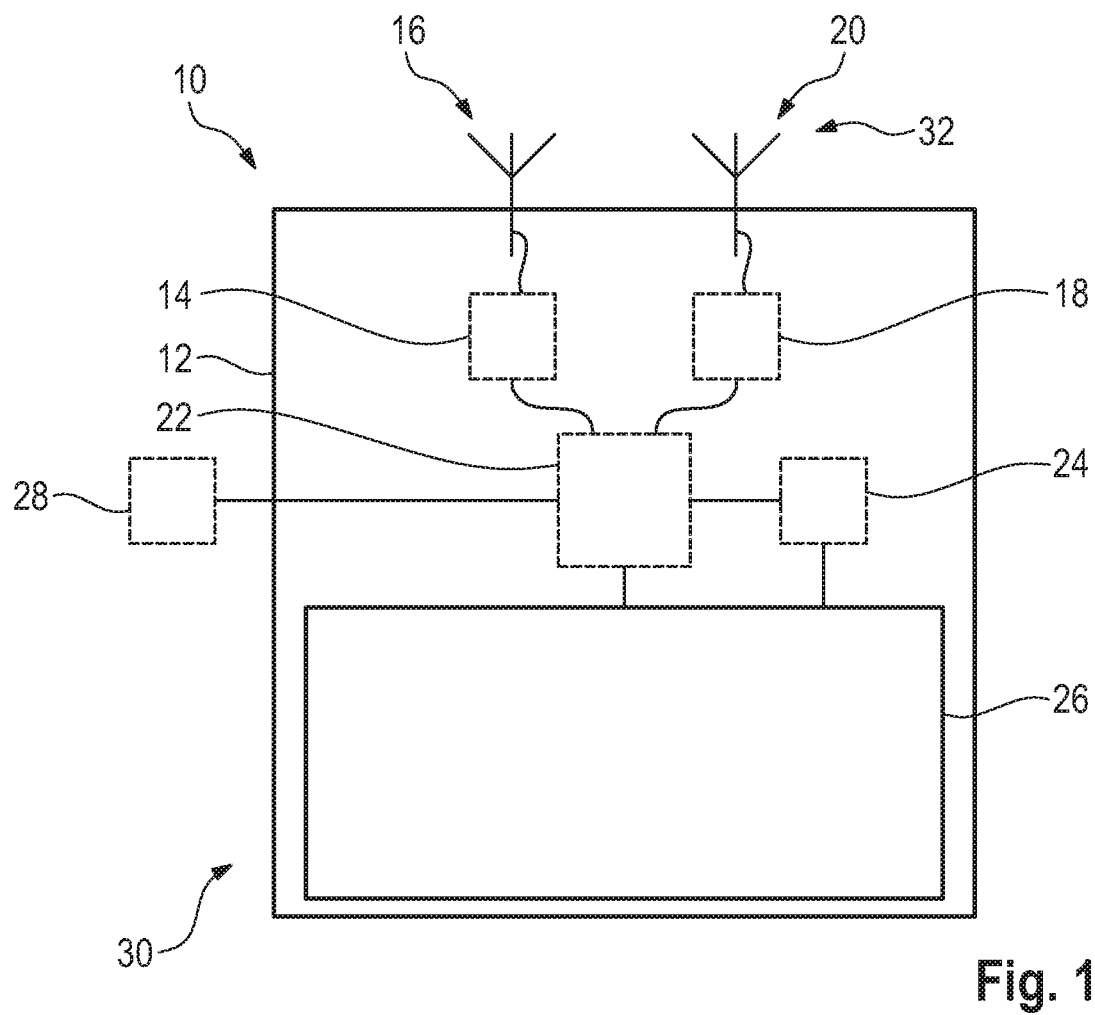
FIG. 1 shows a schematic overview of one representative embodiment of a device according to the present disclosure.

In FIG. 1, a device 10 for timeslot-wise detection of at least one radio signal in a cellular radio network is schematically shown. In some embodiments, the cellular radio network is based on time slots such as a time domain cellular radio network, for instance a long term evolution (LTE) network.

The device 10 comprises a housing 12 that encompasses a first radio receiver 14 which is connected to a first radio antenna 16. Moreover, the housing 12 encompasses a second radio receiver 18 which is connected to a second radio antenna 20. Via the radio antennas 16, 20, the device 10 is enabled to receive at least one radio signal at two separate positions simultaneously, for example a radio signal assigned to the cellular radio network. Hence, the same radio signal is received twice, namely by the two separately formed radio antennas 16, 20.

Figure 2:
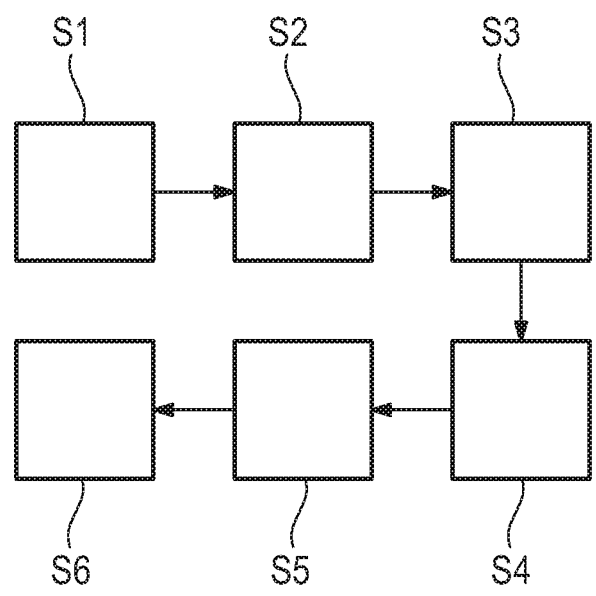
FIG. 2 shows a flow-chart representing one embodiment of one representative embodiment of a method according to the present disclosure.

The radio signal received by the respective radio sensor 16, 20 is forwarded to the corresponding radio receiver 14, 18 for measuring or rather processing purposes as will be described later with respect to FIG. 2. Further, the radio receivers 14 are connected to at least one (central) evaluation unit 22 that is also encompassed in the housing 12.

In the shown embodiment, a single evaluation unit 22 is provided. In some embodiments, the evaluation unit 22 may correspond to a software module that runs on a processor, for example. Alternatively, two or more evaluation units 22 are provided wherein the evaluation units 22 are unambiguously assigned to corresponding radio receivers 14, 18. Hence, one evaluation unit 22 is provided per radio receiver 14, 18.

Further, the at least one evaluation unit 22 is connected with a post-processor 24 that is also located within the housing 12 wherein the post-processor 24 is configured to post-process the output of the at least one evaluation unit 22.

In addition, the device 10 comprises a display 26 which is connected with at least one of the evaluation unit 22 and the post-processor 24. Accordingly, information forwarded to the display 26 via the evaluation unit 22 and/or the post-processor 24 is displayed on the display 26 so that a user of the device 10 is informed appropriately.

The device 10 may further comprise a central unit 28 that may be configured to communicate with the at least one evaluation unit 22. The central unit 28 may also be encompassed in the housing 12. Alternatively, the central unit 28 is located separately as exemplarily shown in FIG. 1. Furthermore, the central unit 28 may be established by a sub-unit of the at least one evaluation unit 26.

The device 10 generally corresponds to a direction finder 30 as will be described hereafter with respect to FIG. 2 in which a flow-chart is shown that illustrates a method of timeslot-wise detection of at least one radio signal in the cellular radio network.

Accordingly, the device 10 may have a directional antenna unit 32. The directional antenna unit 32 may be separately formed with respect to the radio antennas 16, 20. Alternatively, the radio antennas 16, 20 correspond to the directional antenna unit 32 as shown in the embodiment of FIG. 1.

In general, the directional antenna unit 32 may comprise several antenna elements, for example at least one of the radio antennas 16, 20 or rather all radio antennas 16, 20.

The respective method shown in FIG. 2 and described hereinafter can generally be performed by the device 10 shown in FIG. 1.

In a first step S1, a radio signal is received via the radio antennas 16, 20, namely by two separate radio antennas 16, 20, wherein the radio signal is assigned to the cellular radio network.

In a second step S2, the radio signal received by the radio antennas 16, 20 is forwarded to the dedicated radio receivers 14, 18 connected to the corresponding radio antenna 16, 20.

In a third step S3, the radio signal forwarded to the respective radio receivers 14, 18 is processed internally by each of the radio receivers 14, 18. In some embodiments, the radio receivers 14, 18 each measure the radio signal received so as to gather information that is forwarded to the at least one evaluation unit 22 connected to the radio receivers 14, 18.

Each of the radio receivers 14, 18 may obtain baseband data or rather a baseband signal assigned to the radio signal received via the corresponding radio antenna 16, 20.

The information gathered may be assigned to time information, amplitude information and/or phase information which may be used for direction finding purposes.

In some embodiments, the radio receivers 14, 18 each provide a time stamp to the respective radio signal received by the corresponding radio antenna 16, 20, namely the baseband data processed.

In a fourth step S4, the evaluation unit 22 evaluates the data received from the radio receivers 14, 18. In some embodiments, the data is assigned to the radio signal received by the corresponding radio antennas 16, 20.

The evaluation unit 22 synchronizes each of the radio receivers 14, 18 with a preconfigured frame structure, namely the arrangement of the time slot(s) used for uplink signals as well as downlink signals. The preconfigured frame structure may be derived from the radio signal received during the evaluation step performed by the evaluation unit 22 and/or the measuring step done by the radio receivers 14, 18.

Alternatively, the user may have selected a certain communication standard to be investigated at the beginning, particularly manually, such that a certain preconfigured frame structure is expected due to the communication standard under investigation.

During the synchronizing step, the radio receivers 14, 18 may be synchronized with a system clock and/or a timing source of the respective cellular radio network. The system clock or rather timing source is based on the application or rather the communication standard under investigation which in turn is associated to the cellular radio network.

In other words, the preconfigured frame structure used for synchronizing the radio receivers 14, 18 corresponds to the respective communication standard since the communication standard is assigned to the cellular radio network. For instance, the radio receivers 14, 18 are synchronized with an internal clock of the device 10.

In a fifth step S5, the evaluation unit 22 selects at least one identical time slot out of the frame structure at the respective radio receivers 14, 18 each, for example all radio receivers 14, 18. This selection is done after the radio receivers 14, 18 were synchronized with the preconfigured frame structure. The selected identical time slot may correspond to a time slot that is assigned to an uplink.

Put it another way, the evaluation unit 22 selects at least one specific time slot at each of the radio receivers 14, 18 such that an identical time slot of the previously synchronized radio receivers 14, 18 is selected.

Figure 3:
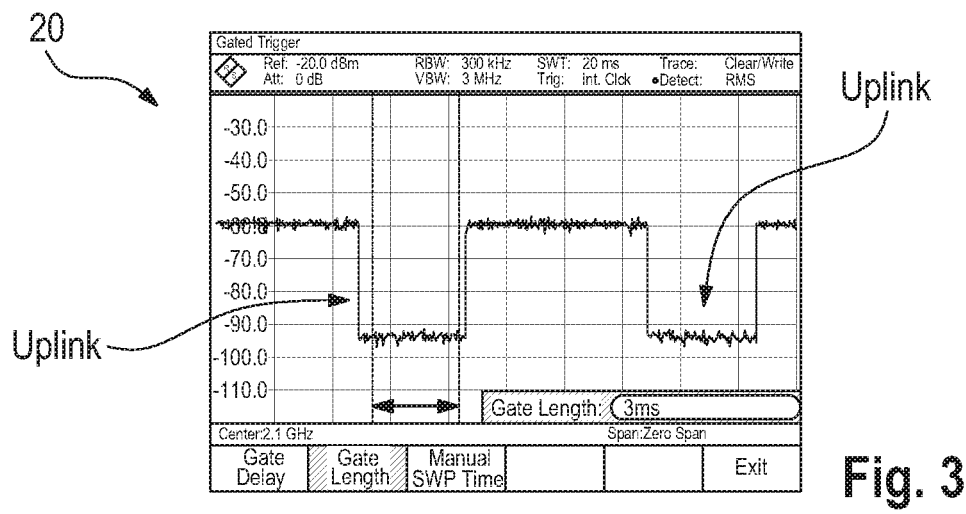
FIG. 3 shows a schematic illustration of a diagram on the display of the device according to FIG. 1 when the method shown in FIG. 2 is performed.

A trigger, for instance a gated trigger or a periodic trigger (10 ms), may be applied on the radio signal received in order to identify the different time slots, for example time slot(s) assigned to uplink. This is schematically illustrated in FIG. 3 wherein the time slots assigned to uplink are marked appropriately. The trigger may be applied in a zero span operation mode of the device 10 in which no sweeping takes place. In other words, the device becomes 10 a fixed-tuned radio receiver system. Certain gate settings may be selected to determine gate delay and gate length.

The specific time slot(s) can be identified visually on the display 26 of the device 10 when displaying the radio signal on which the trigger is applied as indicated in FIG. 3.

In addition, a sweep time may be adjusted manually. Hence, visualization and selection of the respective time slot, namely a time slot assigned to uplink, become easier.

Gate delay and gate length can be retrieved from the two vertical lines shown on the display 26 in the zero span operation mode of the device 10. The gate delay can be retrieved on the left and the gate length can be retrieved on the right; please refer to FIG. 3. The gate length may typically be in the order of 1 ms per uplink time slot.

The gated trigger ensures that at least one specific time slot, in particular a time slot assigned to uplink, is selected from the frame structure. This enables the user to identify a potential interferer in the spectrum received as illustrated in FIGS. 4 and 5.

Figure 4:
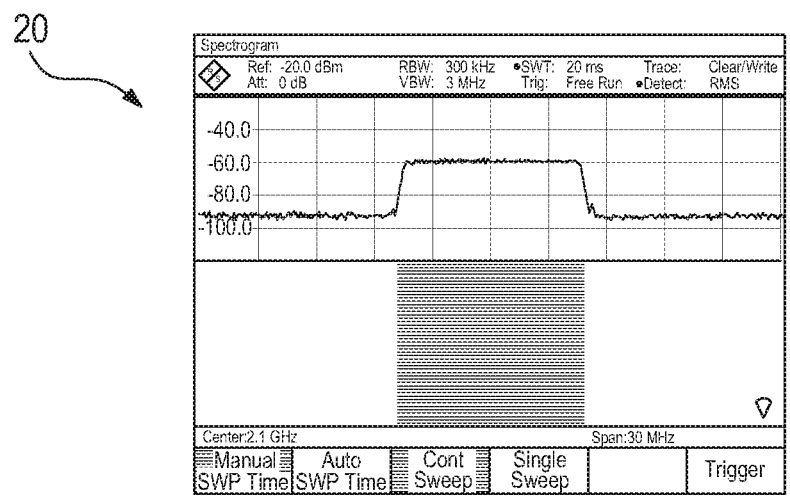
FIG. 4 shows a schematic illustration of a spectrum received on the display of the device according to FIG. 1, wherein the spectrum comprises downlink signals and uplink signals.
Figure 5:
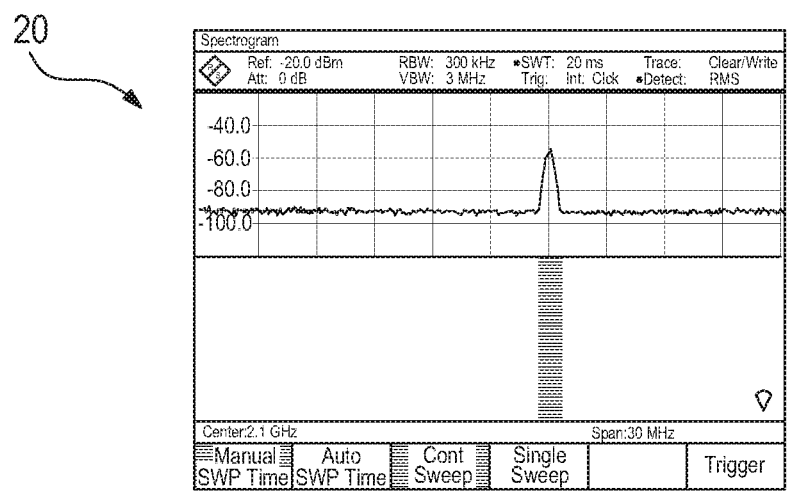
FIG. 5 shows the spectrum received from FIG. 4 when a gated trigger is applied.

In FIG. 4, the spectrum received is shown without any trigger applied whereas the same spectrum is shown in FIG. 5 when the trigger, for example a gated trigger, is applied for identifying time slot(s) assigned to uplink.

In a sixth step S6, timing information of the selected time slot, namely the identical time slot, is obtained by analyzing the baseband data or rather the baseband signals obtained from the radio receivers 14, 18.

The timing information may be provided from the first radio receiver 14 to the second radio receiver 18. Alternatively or additionally, the timing information is provided from the second radio receiver 18 to the first radio receiver 14. Alternatively or additionally, the timing information is provided from the first radio receiver 14 to the central unit 28. Alternatively or additionally, the timing information is provided from the second radio receiver 18 to the central unit 28.

Accordingly, different possibilities are provided wherein the timing information is forwarded or rather exchanged for calculating a time difference of arrival (TDoA). Hence, the device 10 is configured to determine a time difference of the arrival times of the radio signals at the respective radio antennas 16, 20.

The radio receivers 14, 18 each provide a time stamp to the respective baseband signals or rather baseband data wherein the at least one evaluation unit 22 is configured to correlate the data or rather signals in order to calculate a time difference of arrival (TDoA) of the radio signal at the separate radio antennas 16, 20.

As mentioned above, the timing information may be forwarded from the first radio receiver 14 to the central unit 28. Alternatively or additionally, the timing information may be forwarded from the second radio receiver 18 to the central unit 28. Furthermore, the timing information may be exchanged among the radio receivers 14, 18, namely from the first radio receiver 14 to the second radio receiver 18 or vice versa.

The calculated time difference of arrival (TDoA) can be used for direction finding the emitter of the at least one radio signal in order to locate the emitter in an appropriate manner.

Accordingly, the time difference of arrival is calculated in the specific time slot selected previously, namely the identical time slot, so that information used for direction finding is obtained in the respective time slot.

During the evaluation, at least one interference is detected in the radio signal, namely an interfering signal portion that may disturb the wanted signal(s) of the cellular radio network. While detecting the interference, an interfering emitter may be located due to the direction finding.

In some embodiments, with the gated trigger enabled, the device 10 will output all signals in the specific time slot, both normal traffic and other signals such as interferers.

The time difference of arrival calculated may be displayed or rather post-processed irrespective of the kind of signal the radio signal received relates to. Thus, a wanted signal as well as an interfering signal will be displayed or post-processed. However, the post-processing of the signals may be different depending on their respective kind.

For instance, the time difference of arrival calculated or rather a result of the direction finding is displayed graphically on the display 26. For this purpose, the evaluation unit 22 may forward the respective information to the display 26 for visualizing purposes.

The graphic illustration on the display 26 may be an azimuth dial, an illustration of the respective direction and/or a signal-beam. Simultaneously, a map is displayed so that the user of the device 10 is enabled to identify the direction in a faster and simpler manner. In addition, a triangulation may be displayed on the map, for example wherein the map is a heat map.

Further, the emitter detected is written to a flag so that the respective information may be stored. In addition, this information may also be displayed on the display 26.

In some embodiments, the time difference of arrival calculated or rather the result of the direction finding may be post-processed by the post-processor 24.

For instance, a filter or rather a trigger may be applied on the time difference of arrival calculated or rather the result of the direction finding. Hence, noise can be eliminated by post-processing techniques.

Since the direction finding of an emitter of the at least one radio signal takes place in the selected time slot being a specific one, it is ensured that an interfering signal may be detected in a faster and simpler manner since the time slot selected out of the frame structure may be a time slot assigned to uplink.

Accordingly, direction finding of a radio emitter, namely an emitter of a radio signal, is improved in a radio network based on time-slot technique such as a time domain radio network.

The evaluation unit(s) 22, central unit 28, and/or post-processor 24 or other components of the timeslot-wise detection device described herein may include, in some embodiments, logic for implementing the technologies and methodologies described herein. This logic of these components can be carried out in either hardware or software, or a combination of hardware and software. In some embodiments, one or more of these components includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, one or more of these components includes a microprocessor and a memory storing logic modules and/or instructions. In an embodiment, one or more of these components includes one or more ASICs having a plurality of predefined logic components. In an embodiment, one or more of these components includes one or more FPGA having a plurality of programmable logic components. In an embodiment, one or more of these components includes hardware circuit implementations (e.g., implementations in analog circuitry, implementations in digital circuitry, and the like, and combinations thereof). In an embodiment, one or more of these components includes combinations of circuits and computer program products having software or firmware instructions stored on one or more computer readable memories that work together to cause a device to perform one or more methodologies or technologies described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A method of timeslot-wise detection of at least one radio signal in a cellular radio network, wherein a radio signal is received via at least one first radio antenna and at least one second radio antenna, wherein the radio signal received by the respective radio antennas is forwarded to at least one first radio receiver assigned to the first radio antenna and to at least one second radio receiver assigned to the second radio antenna, and wherein the radio signal forwarded is evaluated by the following steps:

synchronizing the first radio receiver with a preconfigured frame structure and synchronizing the second radio receiver with a preconfigured frame structure;

selecting at least one identical time slot out of the frame structure at the first radio receiver and the second radio receiver; and providing timing information of the selected time slot from the first radio receiver to the second radio receiver, from the second radio receiver to the first radio receiver and/or from the respective radio receiver to a central unit for calculating a time difference of arrival.

2. The method according to claim 1, wherein the radio receivers are synchronized with a system clock and/or a timing source of the cellular radio network.

3. The method according to claim 1, wherein the preconfigured frame structure corresponds to a communication standard to be investigated that is used by the cellular radio network.

4. The method according to claim 1, wherein at least one interference is detected in the at least one radio signal such that an interfering emitter is identified.

5. The method according to claim 4, wherein the interfering emitter detected is displayed graphically and/or wherein the interfering emitter detected is written to a flag.

6. The method according to claim 1, wherein the time difference of arrival calculated is post-processed.

7. The method according to claim 1, wherein the location of the emitter identified by direction finding is graphically displayed and/or wherein a flag for a correct or faulty signal is set.

8. A device for timeslot-wise detection of at least one radio signal in a cellular radio network, comprising at least one first radio antenna configured to receive the radio signal, at least one second radio antenna configured to receive the radio signal, at least one first radio receiver configured to process the radio signal, at least one second radio receiver configured to process the radio signal and at least one evaluation unit, wherein the evaluation unit is configured to evaluate the at least one radio signal, wherein the evaluation unit is configured to synchronize the respective radio receivers with a preconfigured frame structure and to select at least one identical time slot out of the frame structure at the respective radio receivers, and wherein the evaluation unit is configured to provide timing information of the selected time slot from the first radio receiver to the second radio receiver, from the second radio receiver to the first radio receiver and/or from the respective radio receiver to a central unit for calculating a time difference of arrival.

9. The device according to claim 8, wherein one evaluation unit is provided for each radio receiver so that each radio receiver is assigned to its own evaluation unit.

10. The device according to claim 9, wherein the at least two evaluation units are interconnected with each other.

11. The device according to claim 8, wherein the respective radio antenna and the corresponding radio receiver are connected with each other so that the radio signal received by the respective radio antenna is forwarded to the corresponding radio receiver.

12. The device according to claim 8, wherein the radio receivers are synchronized with a system clock and/or a timing source of the cellular radio network.

13. The device according to claim 8, wherein the preconfigured frame structure corresponds to a communication standard to be investigated that is used by the cellular radio network.

14. The device according to claim 8, wherein a post-processor is provided that is connected to the evaluation unit, wherein the post-processor is configured to post-process the time difference of arrival calculated.

15. The device according to claim 14, wherein the post-processor is configured to set a flag for a correct or faulty signal is set.

16. The device according to claim 8, wherein a display is provided with which the evaluation unit is connected.

17. The device according to claim 16, wherein the evaluation unit and the display are configured to graphically display the identified location of the emitter on the display.

18. The device according to claim 8, wherein the evaluation unit is configured to detect at least one interference in the at least one radio signal in order to identify an interfering emitter.

19. The device according to claim 18, wherein the evaluation unit and the display are configured to graphically display the interfering emitter detected on the display and/or wherein the evaluation unit and the display are configured to write the interfering emitter detected to a flag.

* * * * *